2,921,409

IMPROVING PALATABILITY OF FRUIT AND VEGETABLES BY TREATING PLANTS WITH SYNTHETIC SWEETENING AGENT

Eli Seifter, Dayton, Ohio, assignor to Monsanto Chemical Company, St. Louis, Mo., a corporation of Delaware No Drawing. Application December 21, 1956
Serial No. 629,776

11 Claims. (Cl. 47—58)

This invention relates to a new and useful method of improving the palatability of various fruit and vegetable crops. It is a specific object of the invention to increase the sweetness of fruit and vegetable crops and to shorten their ripening period. It is also an object of the invention to introduce a synthetic sweetening agent into fruits and vegetables.

It has been found that a synthetic sweetening agent selected from the group consisting of saccharin, sodium saccharin, sodium cyclohexyl sulfamate and calcium cyclohexyl sulfamate may be introduced into the fruit and vegetable tissues of the leafy plants. Examples of fruit and nut trees and vines which may be treated in accordance with the present invention include: apples, peaches, pears, apricots, plums, grapes, oranges, grapefruit, tangarines, mandarins, tangellos, limes, persimmons, bananas, dates, figs, passion fruit, pomegranates, melons and various nuts, such as walnuts, pecans, almonds, filberts and peanuts. Examples of vegetables which may be improved in accordance with the present process include: peas, beans, corn, tomatoes, potatoes, sweet potatoes, turnips, beets, rutabagas, carrots, lettuce, endive, escarole, spinach, kale, cabbage, Brussels sprouts and cauliflower. The supplementation by application of the synthetic sweeting agent is also of utility with bush-type plants, such as: raspberries, blackberries, strawberries, blueberries, cranberries and coffee beans. It is thus possible, for example, to provide coffee in a form which is already sweetened with a synthetic sweetening agent located within the succulent tissues of the coffee bean.

It has been suggested in the past that sucrose solutions be fed to the stems of watermelon and other plants such as peas by dipping a stem of the plant into a bottle of sugar water. However, it has been found that such a procedure does not increase the sweetness of the fruit, but instead merely increases the growth of the plant.

It has now been found that synthetic sweetening agents selected from the group consisting of saccharin, sodium saccharin, sodium cyclohexyl sulfamate and calcium cyclohexyl sulfamate may be introduced into the fruit and vegetable tissues by applying the said synthetic sweetening agent in solid form or aqueous solution to the plants themselves, and specifically to the leaves, stems or roots of the plants. It has also been found that the said synthetic sweetening agents are entirely taken up by the plant without enzymatic break-down in the translocation of the sweetening agent into the fruit or vegetables. In this way the succulent fruit and vegetable tissues of the plant are increased in sweetness and become markedly more palatable. This also makes it possible to shorten the ripening time of the fruit on the trees or vine. Consequently, the fruit may be picked earlier while it is in a firmer condition, thus avoiding losses in shipment and storage. At the same time it is possible to provide the necessary level of sweetness in order to provide a palatable product. This is particularly advantageous in greenhouse culture of winter crops which commonly have little taste or flavor.

The amount of synthetic sweetening agent which is employed in the practice of the present invention is not critical. It has been found that quantities within the range of 0.5 to 100 pounds per acre may readily be used and result in an increased palatability of the fruit and vegetables modified by the process of the present invention. The solutions employed in the application of the said synthetic sweetening agents may contain from 0.5% to 10% by weight of the said agent in water. The proportions are based upon the hydrogen forms of the sweetening agents, e.g., the imide form of saccharin, and N-cyclohexyl sulfamic acid, respectively.

In the application of aqueous solutions directly to the leaves of fruit and vegetable plants for translocation into the fruit and vegetable tissues, the solutions preferably contain from 2% to 10% by weight of the said sweetening agent. Such application is made by spraying the aqueous solutions, which may also contain trace elements such as compounds of iron, zinc, cobalt and boron. It has been found that vegetable crops such as peas, corn, beans and tomatoes may be greatly improved as to sweetness and palatability by such foliar application of a synthetic sweetening agent such as saccharin, as described herein.

In the embodiment of the present invention in which the synthetic sweetening agent is applied to the stem or trunk of the plant, the preferred agent is sodium saccharin. For example, a 2% solution of the sodium form of saccharin may be used in an aqueous solution by applying the solution by gravity feed from a bottle into the trunk of an apple or pear tree. Another method of carrying out the present invention is to utilize pressure injection with a hypodermic needle into the trunk, stem or root of a plant. In the injection system the solutions employed may contain from 0.5% to 2% by weight of the synthetic sweetening agent in water, and the total application to the fruit or vegetable crop may be from 1 to 15 pounds per acre.

Another way in which the solution or solid form of saccharin sweetening agent may be applied is by intravenous feeding of an exposed root of a tree or vine. The solution may be provided in a bottle or other vessel which is suspended above the opening in the stem or root. An opening is drilled into the trunk or root, preferably one of the roots which is near to the surface of the soil. A hose is then used to connect the supply bottle to the opening and a seal such as wax or a waxy polymer is used to prevent leakage at the point of entry into the stem or root of the plant. Another variation of this method of feeding is to use the solid form of the said synthetic sweetening agent, such as sodium saccharin, which in this method is placed in a vessel such as a trough located above a cut or slit in the branch or root of the tree or vine. The circulation of the sap of the plant thus provides contact with the solid sweetening agent for absorption into the plant itself, thus making possible the translocation into the fruit or vegetable.

The following examples illustrate specific embodiments of the invention:

Example 1

An apple orchard of 10 year old Golden Grimes and McIntosh trees was used for testing in order to provide a control plot with said trees having saccharin supplementation. The saccharin was applied as the sodium salt in 2 weight percent concentration in water. The total amount applied to the trees amounts to about 20 g. per tree (about 2.5 lb. per acre). The saccharin solution was fed from separate bottles located in the individual apple trees. The bottles were connected by hoses inserted into holes drilled into the tree trunks. The time of application was about one week before harvesting. It is found that the apples from the saccharin-fed trees were considerably increased in sweetness and that this was characteristic of the apples from all such supplemented trees.

Similar experiments conducted with plums, peaches, pears and Montmorency cherries also showed an increase in sweetness and palatability.

*Example 2*

The use of sodium cyclohexyl sulfamate with green beans is shown in the following example. An aqueous solution containing 2% by weight of sodium cyclohexyl sulfamate was sprayed on green beans about one week before harvesting, the total application to the crop being about 10 pounds per acre. After the green beans were picked, it was found that they had a distinctly sweet taste and were very palatable.

*Example 3*

The application of the amide form of saccharin to tomatoes is shown in this example. A solution containing 2 weight percent of the amide form of saccharin in water was sprayed on the leaves of tomatoes about two weeks before harvesting. It was found that the tomatoes, after being picked, had a greatly-improved, sweet flavor.

What is claimed is:

1. Method of improving the palatability of fruit and vegetable crops which comprises applying directly to the plants of the said crops a synthetic sweetening agent selected from the group consisting of saccharin, sodium saccharin, sodium cyclohexyl sulfamate and calcium cyclohexyl sulfamate.

2. Method of improving the palatability of fruit and vegetable crops which comprises applying directly to the plants of the said crops a synthetic sweetening agent selected from the group consisting of saccharin, sodium saccharin, sodium cyclohexyl sulfamate and calcium cyclohexyl sulfamate, the proportion of the said synthetic sweetening agent applied being from 0.5 to 100 pounds per acre.

3. Method of improving the palatability of fruit and vegetable crops which comprises applying to the leaves of the said crops an aqueous solution of a synthetic sweetening agent selected from the group consisting of saccharin, sodium saccharin, sodium cyclohexyl sulfamate and calcium cyclohexyl sulfamate.

4. Method of improving the palatability of fruit and vegetable crops which comprises applying to the leaves of the said crops an aqueous solution of a synthetic sweetening agent selected from the group consisting of saccharin, sodium saccharin, sodium cyclohexyl sulfamate and calcium cyclohexyl sulfamate, the amount of the said synthetic sweetening agent applied being in the range of from 0.5 to 100 pounds per acre.

5. The method of improving the palatability of fruit and vegetable crops which comprises applying to the plants of the said crop an aqueous solution of sodium saccharin containing from 2% to 10% by weight of the said sodium saccharin, the total application being from 0.5 to 100 pounds per acre of the said crop.

6. The method of improving the palatability of fruit by feeding into the stem of the said fruit plant a synthetic sweetening agent selected from the group consisting of saccharin, sodium saccharin, sodium cyclohexyl sulfamate and calcium cyclohexyl sulfamate.

7. The method of improving the palatability of fruit by feeding into the stem of the said fruit plant a synthetic sweetening agent selected from the group consisting of saccharin, sodium saccharin, sodium cyclohexyl sulfamate and calcium cyclohexyl sulfamate, the said compound being applied as an aqueous solution containing from 0.5 to 2% by weight of the said synthetic sweetening agent, and the total application being from 1 to 15 pounds per acre of the said fruit crop.

8. Method of improving the palatability of fruit by feeding into the stem of the said fruit plant an aqueous solution of sodium saccharin containing from 0.5 to 2% by weight of the said sodium saccharin, the total application being from 1 to 15 pounds per acre of the said fruit crop.

9. The method of improving the palatability of fruit by feeding into the root of the said fruit plant a synthetic sweetening agent selected from the group consisting of saccharin, sodium saccharin, sodium cyclohexyl sulfamate and calcium cyclohexyl sulfamate.

10. The method of improving the palatability of fruit by feeding into the root of the said fruit plant a synthetic sweetening agent selected from the group consisting of saccharin, sodium saccharin, sodium cyclohexyl sulfamate and calcium cyclohexyl sulfamate, the said compound being applied as an aqueous solution containing from 0.5 to 2% by weight of the said synthetic sweetening agent, and the total application being from 1 to 15 pounds per acre of the said fruit crop.

11. The method of improving the palatability of fruit by feeding into the root of the said fruit plant an aqueous solution of sodium saccharin containing from 0.5 to 2% by weight of the said sodium saccharin, the total application being from 1 to 15 pounds per acre of the said fruit crop.

References Cited in the file of this patent

UNITED STATES PATENTS

| 1,686,964 | Eggert | Oct. 9, 1928 |
| 1,978,201 | Heuer | Oct. 23, 1934 |

FOREIGN PATENTS

| 971,436 | France | July 19, 1950 |
| 6,843 | Great Britain | of 1887 |

OTHER REFERENCES

Publication: "Plant Injection for Diagnostic and Curative Purposes" (Roach), published October 1938 as Technical Communication No. 10 by Imperial Bureau of Horticulture and Plantation Crops (East Malling, Kent, England), pages 7, 8, 15, 16, 47 are relied on.